US012579476B2

(12) United States Patent
Raveh

(10) Patent No.: US 12,579,476 B2
(45) Date of Patent: Mar. 17, 2026

(54) ADAPTIVE LEARNING FOR IMAGE CLASSIFICATION

(71) Applicant: Orbotech Ltd., Yavne (IL)

(72) Inventor: Gonen Raveh, Moshav Timorim (IL)

(73) Assignee: Orbotech Ltd., Yavne (IL)

( * ) Notice: Subject to any disclaimer, the term of this patent is extended or adjusted under 35 U.S.C. 154(b) by 1417 days.

(21) Appl. No.: 17/164,756

(22) Filed: Feb. 1, 2021

(65) Prior Publication Data

US 2021/0295213 A1     Sep. 23, 2021

Related U.S. Application Data

(60) Provisional application No. 62/993,112, filed on Mar. 23, 2020.

(51) Int. Cl.
*G06N 20/20*          (2019.01)
*G06F 18/22*          (2023.01)
(Continued)

(52) U.S. Cl.
CPC ............. *G06N 20/20* (2019.01); *G06F 18/22* (2023.01); *G06F 18/24* (2023.01); *G06N 20/00* (2019.01); *G06V 10/764* (2022.01); *G06V 10/774* (2022.01)

(58) Field of Classification Search
CPC .......... G06N 20/00; G06N 3/08; G06N 3/045; G06N 5/01; G06N 7/01; G06N 3/084;
(Continued)

(56) References Cited

U.S. PATENT DOCUMENTS

2005/0278322 A1    12/2005  Fan et al.
2006/0282425 A1*   12/2006  Aggarwal ............. G06F 16/283
                                                     707/999.005
(Continued)

FOREIGN PATENT DOCUMENTS

CN        109117867 A      1/2019
JP       2019106694 A      6/2019
(Continued)

OTHER PUBLICATIONS

Sun et al., "Dynamic financial distress prediction with concept drift based on time weighting combined with Adaboost support vector machine ensemble", Knowledge-Based Systems, Mar. 15, 2017, pp. 4-14, vol. 120, Elsevier.
(Continued)

*Primary Examiner* — Luis A Sitiriche
(74) *Attorney, Agent, or Firm* — Hodgson Russ LLP

(57)                    ABSTRACT
A method, a computerized apparatus and a computer program product for adaptive learning for image classification. The method comprises applying a set of classification models on a calibration dataset and on a production dataset, and calculating disagreement measurements over the predictions thereof on each dataset. Based on similarity measurement between the disagreement measurement of the calibration and the production datasets, being below a predetermined threshold, a data drift is indicated in the production dataset. The method further comprises determining a training dataset for training a classification model for the production dataset. The training dataset is selected over a plurality of sets of images ordered according to time intervals in which images therein are obtained. The selection is performed based on weights determined for the plurality of sets.

9 Claims, 9 Drawing Sheets

(51) Int. Cl.

| | |
|---|---|
| *G06F 18/24* | (2023.01) |
| *G06N 20/00* | (2019.01) |
| *G06V 10/764* | (2022.01) |
| *G06V 10/774* | (2022.01) |

(58) Field of Classification Search
CPC ........ G06N 20/20; G06N 20/10; G06N 3/044; G06N 5/04; G06N 5/022; G06N 3/048; G06N 3/04; G06N 3/047; G06N 3/09; G06N 3/088; G06N 5/02; G06N 3/006; G06N 3/0464; G06N 3/0442; G06N 3/049; G06N 3/063; G06N 3/094; G06N 5/00; G06N 7/00; G06N 3/06; G06N 7/02; G06N 3/042; G06N 5/025; G06N 3/02; G06N 3/0455; G06N 5/045; G06N 5/046; G06N 3/0475; G06N 3/082; G06N 3/0895; G06N 3/092; G06N 3/10; G06N 5/047; G06N 3/0499; G06N 3/086; G06N 3/126; G06N 3/00; G06N 3/043; G06N 3/091; G06N 3/096; G06N 3/098; G06N 5/048; G06N 7/023; G06N 7/08; G06N 99/00; G06N 10/60; G06N 3/008; G06N 3/065; G06N 5/027; G06N 5/041
See application file for complete search history.

(56) References Cited

U.S. PATENT DOCUMENTS

| | | |
|---|---|---|
| 2018/0068224 A1 | 3/2018 | Chen et al. |
| 2019/0034822 A1 | 1/2019 | Farré Guiu et al. |
| 2019/0065908 A1* | 2/2019 | Lee .................... G06F 18/2155 |

FOREIGN PATENT DOCUMENTS

| | | |
|---|---|---|
| TW | I575395 B | 3/2017 |
| TW | 201935294 A | 9/2019 |
| TW | 202004513 A | 1/2020 |
| WO | 2017201107 A1 | 11/2017 |

OTHER PUBLICATIONS

Sethi et al., "On the reliable detection of concept drift from streaming unlabeled data", Expert Systems with Applications, Mar. 31, 2017, pp. 77-99, vol. 82, Elsevier (available at https://https://arxiv.org/pdf/1704.00023.pdf).
WIPO, International Search Report for International Application No. PCT/US2021/050242, May 27, 2021.
CNIPA, Office Action for CN Application No. 202180022922.0, Jun. 16, 2023 (see X/Y/A designations on pp. 4-5).
TIPO, Office Action issued in ROC Patent Application No. 110107900, Mar. 14, 2025.
Sethi et al., "Handling adversarial concept drift in streaming data," Expert Systems with Applications, May 1, 2018, vol. 97, pp. 18-40.
Mahdi et al., "Diversity measure as a new drift detection method in data streaming," Knowledge-Based Systems, Mar. 5, 2020, vol. 191.
Chinavle et al., "Ensembles in Adversarial Classification for Spam," Proceedings of the 18th ACM Conference on Information and Knowledge Management, Nov. 2, 2009.
EPO, Extended European Search Report issued for European Application No. 21775438.1, Feb. 28, 2024.
Mahdi et al., "Fast Reaction to Sudden Concept Drift in the Absence of Class Labels," Applied Sciences, Jan. 14, 2020, vol. 10, No. 2.
JPO, Office Action issued for Japanese Application No. 2022-557888, Sep. 18, 2024.

* cited by examiner

ADAPTIVE LEARNING FOR IMAGE CLASSIFICATION

CROSS-REFERENCE TO RELATED APPLICATIONS

This application claims priority to the provisional patent application filed Mar. 23, 2020, and assigned U.S. App. No. 62/993,112, the disclosure of which is hereby incorporated by reference.

TECHNICAL FIELD

The present disclosure relates to image classification in general, and to adaptive learning for image classification, in particular.

BACKGROUND

Artificial Intelligence (AI) is a fundamental tool for many tasks in different computational systems. AI simulates human intelligence processes by machines, computer systems, learning algorithms, or the like. The intelligence processes may comprise learning the acquisition of information and rules for using the information, reasoning using rules to reach approximate or definite conclusions and self-correction. Particular applications of AI comprise expert systems, speech recognition, machine vision, autonomous driving, intelligent routing in content delivery networks, military simulations, and the like.

The use of AI has become very popular in inspection systems, in particular systems aimed for identification and classification of items or defects in items, products, and the like. AI techniques have become an essential part of the technology industry, helping to solve many challenging problems in the manufacturing process.

BRIEF SUMMARY

One exemplary embodiment of the disclosed subject matter is a method comprising: obtaining a set of classification models, each of which is configured to predict a label for an image, wherein the predicted label indicates a class of the image, wherein each classification model of the set of classification models is configured to predict a label from a same set of labels; applying the set of classification models on a calibration dataset of images, whereby providing for each image of the calibration dataset of images an array of predicted labels, whereby providing a set of arrays of predicted labels for the calibration dataset; calculating a disagreement measurement of the set of classification models on the calibration dataset, wherein the disagreement measurement is calculated based on the set of arrays of predicted labels for the calibration dataset, wherein the disagreement measurement is affected by differences between predictions of classification models of the set of classification models; applying the set of classification models on a production dataset of images, whereby providing a set of arrays of predicted labels for the production dataset; calculating a production disagreement measurement of the set of classification models on the production dataset; determining a similarity measurement between the production disagreement measurement and the disagreement measurement; in response to the similarity measurement being below a predetermined threshold, indicating a data drift in the production dataset.

Another exemplary embodiment of the disclosed subject matter is a method comprising: obtaining an image dataset, wherein the image dataset comprises an ordered plurality of sets of images, wherein each set of images comprises images obtained over a time interval, wherein the sets of images are ordered according to their respective time intervals; determining a training dataset, wherein the training dataset comprises images from the image dataset, wherein said determining the training set comprises: determining weights for the ordered plurality of sets of images, wherein each set of images is associated with a weight, wherein at least two sets of images are associated with different weights; and selecting from the ordered plurality of sets of images, a subset of images to be comprised by the training dataset, wherein said selecting is based on the weights; and training a classification model using the training dataset.

Yet another exemplary embodiment of the disclosed subject matter is a computerized apparatus having a processor, the processor being adapted to perform the steps of: obtaining a set of classification models, each of which is configured to predict a label for an image, wherein the predicted label indicates a class of the image, wherein each classification model of the set of classification models is configured to predict a label from a same set of labels; applying the set of classification models on a calibration dataset of images, whereby providing for each image of the calibration dataset of images an array of predicted labels, whereby providing a set of arrays of predicted labels for the calibration dataset; calculating a disagreement measurement of the set of classification models on the calibration dataset, wherein the disagreement measurement is calculated based on the set of arrays of predicted labels for the calibration dataset, wherein the disagreement measurement is affected by differences between predictions of classification models of the set of classification models; applying the set of classification models on a production dataset of images, whereby providing a set of arrays of predicted labels for the production dataset; calculating a production disagreement measurement of the set of classification models on the production dataset; determining a similarity measurement between the production disagreement measurement and the disagreement measurement; in response to the similarity measurement being below a predetermined threshold, indicating a data drift in the production dataset.

Yet another exemplary embodiment of the disclosed subject matter is a computer program product comprising a non-transitory computer readable storage medium retaining program instructions, which program instructions when read by a processor, cause the processor to perform a method comprising: obtaining a set of classification models, each of which is configured to predict a label for an image, wherein the predicted label indicates a class of the image, wherein each classification model of the set of classification models is configured to predict a label from a same set of labels; applying the set of classification models on a calibration dataset of images, whereby providing for each image of the calibration dataset of images an array of predicted labels, whereby providing a set of arrays of predicted labels for the calibration dataset; calculating a disagreement measurement of the set of classification models on the calibration dataset, wherein the disagreement measurement is calculated based on the set of arrays of predicted labels for the calibration dataset, wherein the disagreement measurement is affected by differences between predictions of classification models of the set of classification models; applying the set of classification models on a production dataset of images, whereby providing a set of arrays of predicted labels for the production dataset; calculating a production disagreement measurement of the set of classification models on the production dataset; determining a similarity measurement between the production disagreement measurement and the disagreement measurement; in response to the similarity measurement being below a predetermined threshold, indicating a data drift in the production dataset.

Yet another exemplary embodiment of the disclosed subject matter is a computerized apparatus having a processor, the processor being adapted to perform the steps of: obtaining an image dataset, wherein the image dataset comprises an ordered plurality of sets of images, wherein each set of images comprises images obtained over a time interval, wherein the sets of images are ordered according to their respective time intervals; determining a training dataset, wherein the training dataset comprises images from the image dataset, wherein said determining the training set comprises: determining weights for the ordered plurality of sets of images, wherein each set of images is associated with a weight, wherein at least two sets of images are associated with different weights; and selecting from the ordered plurality of sets of images, a subset of images to be comprised by the training dataset, wherein said selecting is based on the weights; and training a classification model using the training dataset.

Yet another exemplary embodiment of the disclosed subject matter is a computer program product comprising a non-transitory computer readable storage medium retaining program instructions, which program instructions when read by a processor, cause the processor to perform a method comprising: obtaining an image dataset, wherein the image dataset comprises an ordered plurality of sets of images, wherein each set of images comprises images obtained over a time interval, wherein the sets of images are ordered according to their respective time intervals; determining a training dataset, wherein the training dataset comprises images from the image dataset, wherein said determining the training set comprises: determining weights for the ordered plurality of sets of images, wherein each set of images is associated with a weight, wherein at least two sets of images are associated with different weights; and selecting from the ordered plurality of sets of images, a subset of images to be comprised by the training dataset, wherein said selecting is based on the weights; and training a classification model using the training dataset.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
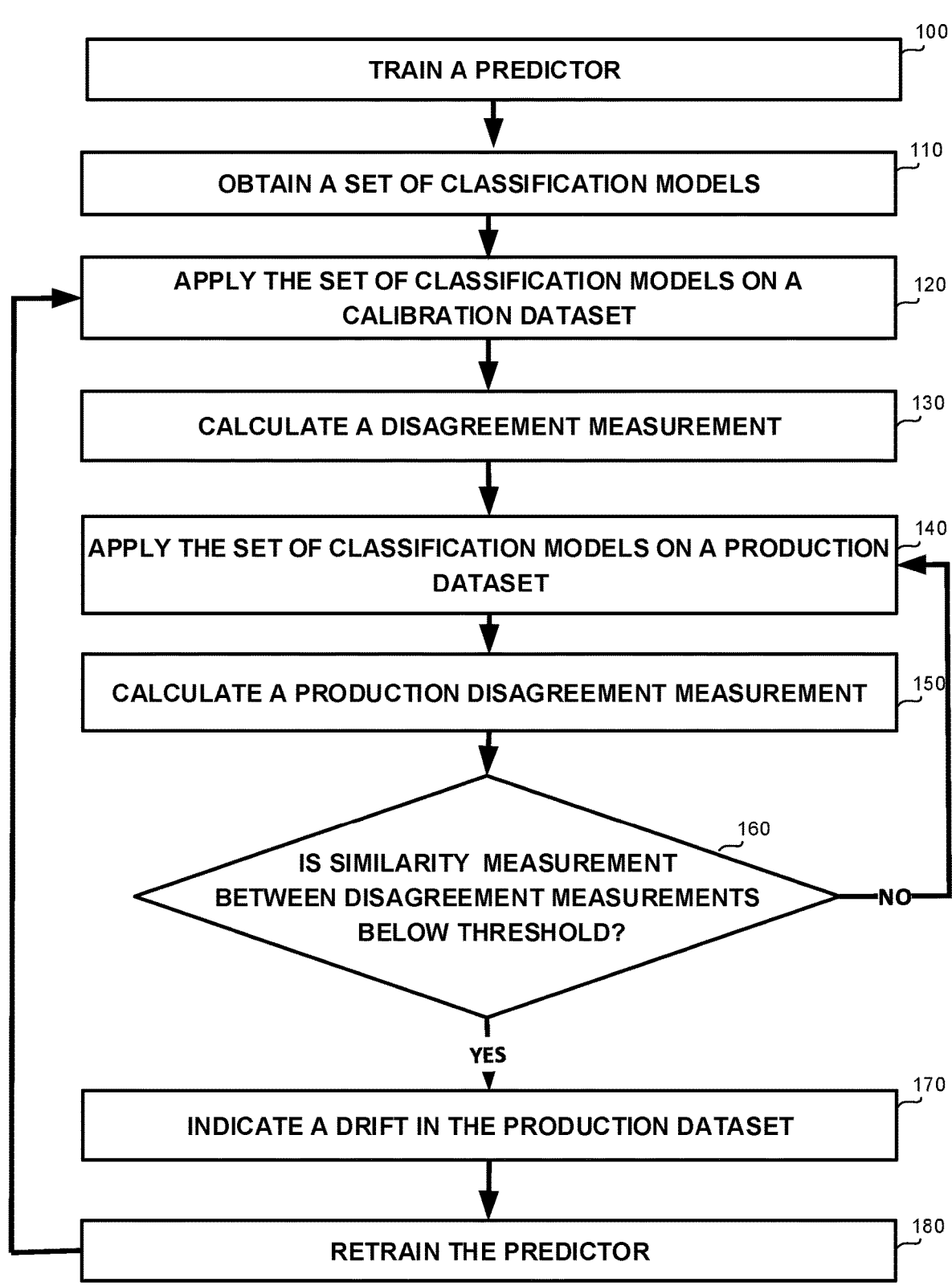
FIG. 1 shows a flowchart diagram of a method, in accordance with some exemplary embodiments of the disclosed subject matter.

One technical problem dealt with by the disclosed subject matter is to provide an autonomous, self-learning image classification tool that can be deployed on a customer site and detached from a developer thereof. In some exemplary embodiments, the self-learning image classification tool may preserve prediction accuracy over time, despite potential changes in the data.

In some exemplary embodiments, production processes, such as in a factory, in a production plant, or the like, may be monitored on the customer site using AI-based tools utilizing image classification. Such AI-based tools may be utilized in inspection systems for identification and classification of items or defects in items, products, or the like, in the manufacturing process. In some exemplary embodiments, AI-based tools may be configured to determine, based on visual input, if the machine functions properly, if the produced item is in accordance with the production plan, or the like. The visual input may comprise images of the products produced by the machine, at different production stages, from different angles, or the like. The AI-based tools may be configured to perform image classification on such images, in order to classify items within the images, identify defects within items or products, or the like. The AI-based tools may be configured to apply deep learning or other machine learning methods for solving image classification learning tasks. As an example, AI-based software may be used for Automated Optical Inspection (AOI), such as in Flat Panel Displays (FPD) manufacture, Printed Circuit Board (PCB) manufacture, or the like. The AOI processes may be based on image classification and other AI techniques.

In some exemplary embodiments, monitoring a production process, such as by AOI, may be performed in a detached customer site, such as in a customers' factory, without providing full information to the developer of the AI-based tool or image classification model thereof. The provided information to the developer may be limited in order to limit the information potentially disclosed to competing parties related to the developer, such as other customers, development centers, or the like. The AI-based tools may be required to operate and adapt without the ability to send or share information with other AI software, the developer thereof, research and development center, or the like. Additionally or alternatively, the AI-based tools may operate in a connected environment, but may be subject to restrictions over volume of data to transfer and share with third parties, including the developer thereof. As a result, the training of classification models in such AI-based tools may be a relatively hard task, due to the relatively diminutive available updated training data at the development site, and the limited computational resources at the customer site that cannot deal with large amounts of training data.

Another technical problem dealt with by the disclosed subject matter is to preserve prediction accuracy and performance of image classification models, despite changes that may occur on the detached customer site. In some exemplary embodiments, AI-based models or image classification models may be developed and trained based on initial training datasets, e.g., which may be obtained from the customer or from other sources, and then provided for the customer for solving image classification learning tasks. Such AI-based and image classification models may be continuously monitored to preserve their prediction quality. The prediction quality of such models may be affected by several elements, such as changes in the imaging techniques, degradation of the camera or other optical sensors, changes in the lighting conditions, changes in the customer process, using different materials, changes in the data-generation processes, changes in the generated product, or the like. As an example, in FPD or PCB manufacture, image pixels may be changed due to changes in the color of the manufactured FPD or PCB, due to using different material in the production, or the like. Such changes may affect the reflectance, transmittance, or the like, of the images to be classified. As another example, in FPD or PCB manufacture, rapid changes, even though miniature, may be continuously performed on the generated products, such as for adapting the products to customer needs, adapting to new design features, or the like. As a result, new defects in the products may be introduced and required to be identified and fixed.

In some exemplary embodiments, the changes in the data may not appear in statistical measurements of the data, however may still be required to be classified differently. New images may have similar statistical features as old images, such as distribution of pixels, colors, or the like. However, new images may capture new manufacturing defects that may not appear in previously obtained images, recently obtained images, or the like.

In some exemplary embodiments, methods for preserving the prediction accuracy of the AI-based models, such as training a new model every several days, may not provide a sufficient solution. As an example, such re-training may not take into account the underlying changes affecting prediction accuracy. As a result, new trained models may be overfitting to a given dataset, presenting less and less generalization capabilities, or the like. Thus the prediction accuracy of the AI-based tools may go under degradation.

Yet another technical problem dealt with by the disclosed subject matter is to provide for a continuous AI learning that deals with continuous changes in the data. AI-based models may be required to be sensitive to changes in the data to be classified on the one hand, but may also be required to be stable, e.g., not to be disrupted by new data. Referring to the above mentioned example, in FPD or PCB industries, deep learning classification models for image defect detection may be utilized. In such industries, fast changes between manufactured devices may be common, such as a new device or portion thereof every two or three days may replace the scanned design utilized for training. As a result, accurate classification on recent designs and less on old scanned designs may be required. However, the old scanned designs may still be relevant for the classification task, such as for fundamental components of the device, frequently appearing defects, or the like.

In some exemplary embodiments, AI-based classification models may be consciously retrained based on new data in order to preserve accuracy of their prediction. In some cases, new types of data may be obtained every few hours, every few days, or the like. AI-learning techniques may be required to deal with new types of data. However, the amount of the data increases over the time, and the techniques may not be able to train or re-train the classification models using such large volume of data, which may also include duplicate images or almost-duplicate images. In some exemplary embodiments, AI-learning techniques may be designed to completely "forget" previously learned data upon learning new data. As an example, in response to obtaining a new dataset of data, a retraining of the classification model may be performed with respect to the new dataset, while completely forgetting the last training dataset, the oldest samples thereof, training using only a portion of the last training dataset, or the like. Such solution, despite being able to potentially reduce the amount of the training data for re-training, may result in losing data important to the training, such as old data that is more relevant to current samples than newer data, or the like. Other naïve AI retraining algorithms may re-train with the whole amount of data while wasting expensive computational resources and time. Additionally or alternatively, AI retraining algorithms may retrain models using a predetermined percentage, e.g., between 0% to 100%, from all available datasets, uniformly. However, such algorithms may miss important data relevant to training, use irrelevant data to the current classification task, or the like.

One technical solution is to apply, multiple classification models that enable, based on the agreement over the multiple classification models, to determine whether a data drift has occurred. In some cases, in view of the data drift, additional or alternative training may be required. In some exemplary embodiments, the solution may be implemented at the customer site. Additionally or alternatively, the solution may be implemented in an autonomous manner.

In some exemplary embodiments, each classification model may be configured to predict a label for an image, indicating a class thereof from a same set of labels. The plurality of classification models may comprise different classification models from different types, several classification models from the same type, or the like. As an example, the plurality of classification models may comprise one or more supervised learning models, one or more unsupervised learning models, one or more semi-supervised learning models, one or more Automatic Machine Learning (AutoML) generated models, one or more lifelong learning models, one or more ensemble of classification models, one or more learning with noisy labels assumption models, or the like. In some exemplary embodiments, training of the classification models may be performed using the same training dataset, different training datasets, or the like. It may be noted that the set of labels of the classification models may or may not be identical to the set of labels of the predictor utilized in the image classification task. Each classification model may be configured to predict, for an image, a label from the same set of labels of the predictor.

Additionally or alternatively, the plurality of classification models may comprise one or more in-distribution classification models. The in-distribution classification models may be trained in an unsupervised manner in order to properly model the incoming images pixel values distribution. Such in-distribution classification model may be employed to determine whether a set of images exhibit the same or similar statistical properties as the training distribution (e.g., "in-distribution") or sufficiently different statistical properties (e.g., "out-of-distribution"). In some exemplary embodiments, the in-distribution classification model may be a binary classification model. The binary classification model may be a detector, $g(x): X \rightarrow \{0, 1\}$, which assigns label 1 if data is from in-distribution, and label 0 otherwise.

In some exemplary embodiments, the plurality of classification models may be applied on a calibration dataset of labelled images. The calibration dataset may comprise multiple images from different training stages, different production rounds, or the like. Each image from the calibration dataset may be provided with an array of predicted labels, each of which provided by a different classification model. In some exemplary embodiments, a disagreement measurement of the plurality of classification models on the calibration dataset may be calculated. The disagreement measurement may be calculated based on the plurality of arrays of predicted labels for the calibration dataset. The disagreement measurement may be affected by differences between predictions of classification models of the plurality of classification models. The plurality of classification models may then be applied on a production dataset of unlabelled images, e.g., a set of newly obtained images. A production disagreement measurement of the plurality of classification models on the production dataset may be calculated and compared with the disagreement measurement of the plurality of classification models on the calibration dataset. Based on a similarity measurement between the production disagreement measurement and the training-stage disagreement measurement, a data drift in the production dataset may be determined. In some exemplary embodiments, similarity measurement being below a threshold may be indicative of a data drift.

In some exemplary embodiments, a predictor may be utilized to predict a label for an image. The predictor may be applied on the production dataset to predict labels thereof. For example, the predictor may label images into categories indicating a proper production output, an output caused by a malfunction (and a type of a malfunction), or the like. In some exemplary embodiments, the plurality of classification models may comprise the predictor. The predictor may be applied on the calibration dataset and on the production dataset along with the other classification models, and the predicted labels thereof may be compared as being in the arrays of predicted labels. Additionally or alternatively, the predictor may be excluded from the plurality of classification models. Assuming the predictor was validated against the calibration dataset, as long as the production dataset exhibits similar disagreement measurements of the plurality of classification models over the calibration dataset and the production dataset, it may be assumed that the predictor remains valid when applied on the production dataset.

In some exemplary embodiments, in response to indicating a drift in the production dataset, the predictor utilized for the classification task may be retrained. The predictor may be retrained based on at least a portion of the production dataset. The baseline disagreement measurement may be re-computed based on the at least a portion of the production dataset utilized for the re-training. The retrained predictor may replace the predictor in case of improved accuracy of the retrained predictor over the predictor, with respect to a validation dataset.

It may be noted that in some cases, the lifelong learning of image classification models may be with a fixed set of output classes, meaning that the learning problem does not change in terms of number of classes over time, in order to reduce the complexity of the training. In some exemplary embodiments, irrelevant classes, such as classes with no samples classified therein, classes with no new samples classified thereto, or the like, may be removed from the output classes. Additionally or alternatively, new classes may be created and added over time.

Another technical solution is to retrain the classifiers using adaptive training dataset selected in a non-uniform manner from data obtained over different time intervals. In some exemplary embodiments, the training data may be obtained over time. Each subset of data may be obtained in a different time interval, such as every few hours, every few days, or the like. When a new dataset, e.g., new samples to be classified, is obtained, a new training dataset may be determined. The new training dataset may comprise different percentage of samples from different time intervals.

In some exemplary embodiments, an ordered plurality of sets of images to be utilized to determine the training dataset may be obtained. In some exemplary embodiments, the ordered plurality of sets may be ordered by their ascending date. In some exemplary embodiments, the extent of the meaning or informative value the dataset may be determined or estimated, such as based on knowledge of domain experts, based on accuracy of training of a classification model based thereon, or the like. In some exemplary embodiments, a weight indicating the number or percentage of images to select from each set may be determined. The weight may be non-uniform, e.g., at least two sets may be assigned with different weights. The selection of images to be comprised by the training dataset may be performed in accordance with the weights, such as obtaining in a random or pseudo-random manner, a sample of each set in accordance with the associated weight thereof. As an example, the weight of a first set may be 10%, indicating to select a sample of 10% from the population of the set to be included in the training dataset. A second set may be associated with a weight of 5%, indicating that the training dataset will include a sample of 5% selected from the population of the second set.

As an example, the weight of each set may be determined based the accuracy of a classifier trained based thereon, the accuracy of a classifier trained based on a predetermined number of successive sets ending with the set, or the like. The accuracy of the classifier may be calculated based on application of the classifier on the newest set, on a set successive to the associated set, or the like. As another example, the weight of each set may be correlated to the differences between the accuracy metrics of the set and sets from previous time intervals. As yet another example, the weight may be determined based on a monotonic pattern associated with the order of the plurality of sets over time, such as "past means more" pattern, e.g., greater weight may be given to older sets than recent sets; a "past means less" pattern, e.g., lower weight may be given to old sets than to recent sets, or the like. In such a principle, the customer may be provided with the option to have a trained model which is expected to perform better on instances similar to recent samples and less accurate on instances that resemble past samples, or vice versa. It may be noted that, the sample-inclusion curve may be linear growth or decay, non-linear growth or decay, exponential growth or decay, or the like.

In some exemplary embodiments, a validation set for the training may be determined. The validation set may be utilized to compute the accuracy of a classifier, such as the predictor. In some exemplary embodiments, the validation set may be determined oppositely to the selected training set. As an example, in case the selected percentage of samples from sets for the training set increases from past to present, selected percentage of samples from sets for the validation set may decrease from past to present. As an example, if the training set selection pattern is past-means-less that grows nonlinearly, the validation-set pattern selection may be past-means-more that grows nonlinearly. In some exemplary embodiments, the weights for the training dataset may be determined using function $f(x)$, over the order of the sets (e.g., x indicating time or other), while the weights for the validation dataset may be determined based on the function −ƒ(x). As such, when the training dataset is determined using "past-means-more" pattern, the validation dataset is determined using "past-means-less" pattern, and vice versa.

One technical effect of utilizing the disclosed subject matter is providing for an autonomous solution for adaptive autonomous learning, disconnected from external computing and databases and adapted to the customer site conditions. The disclosed subject matter enables enhancing the accuracy of image classification AI models, without exposing data of the factory or the production plant utilizing the AI classifiers, to the developer of the AI models or to any other external party. The disclosed subject matter provides an automatic capability to stabilize the accuracy and user-approved performance of image classification AI-models under enormous set of changes, using an adaptive training, judged by a large and diverse AI models that together, via set of similar models, ensemble models, contradicting models and data-distribution-change-detector models, packaged into a large binary executable AI model, may be applied in the customer site. Moreover, the disclosed subject matter supports a full learning regularization and moderation process were a set of control models serve as a set of external judges over the prediction results of the main classification predictor.

Another technical effect of utilizing the disclosed subject matter is reducing the Time To Market (TTM) required from a product being conceived until its being available for sale. TTM may be important in industries where products are outmoded quickly, especially in the world of micro-electronics, such as in FPD, PCB, or the like. The disclosed subject matter provides for an adaptive learning with more accurate training that improves the accuracy, robustness and stability of AI-based software, and enables automatic model performance tracking and enhancing in lower time complexity. The disclosed subject matter reduces the TTM by reducing the amount of training data required after each change in the production line.

Yet another technical effect of utilizing the disclosed subject matter is increasing the adeptness and the accuracy of AI-based long-life classification models that require continuous re-training. The disclosed subject matter provides a mechanism to "memorize" and "forget" samples going into the retraining dataset, and thus reducing the amount of training data, while enhancing the accuracy of the training. Such mechanism enables a continuous adaptive lifelong learning for the AI-based classification models, without increasing computational and time complexity required thereto overtime. Furthermore, such mechanism avoids overfitting of the re-trained classification models to a given dataset, such as the latest dataset, or the like. The disclosed subject matter enables introducing more generalization capabilities to the re-trained classification models, by retraining according wide variety of data from different production stages over time. Furthermore, the disclosed subject matter provides an efficient validation mechanism, where the selection of validation data is performed in an opposite pattern to the selection of training data. Such mechanism may make the convergence harder to the classification model, and may enable to validate whether retraining of the classification model was successful and drive the classifier to generality.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a flowchart diagram of a method, in accordance with some exemplary embodiments of the disclosed subject matter.

On Step 100, a predictor may be trained. The predictor may be utilized for an image classification task. The predictor may be configured to predict, for an image, a label from the set of labels. In some exemplary embodiments, the predictor may be trained using a training dataset comprising images and labels thereof indicating a class of each image. The training dataset may comprise images labelled manually by human experts, images labelled using predictors utilized in previous iterations, images labelled by classification models and validated by human experts, or the like.

On Step 110, a set of classification models may be obtained. Each classification model may be configured to predict a label for an image. The predicted label may indicate a class of the image. Each classification model of the set of classification models may be configured to predict a label from a same set of labels as the predictor.

In some exemplary embodiments, the set of classification models may be selected from a plurality of classification models from different types, with different parameters, with different conditions, with different types of learning, or the like. The classification models may be trained using a training dataset that may comprise both labelled and unlabelled images. The training dataset may comprise the training dataset utilized for training the predictor or portions thereof. Additionally or alternatively, the training dataset may comprise both labelled and unlabelled images, such as images considered to be mis-labelled, new images from new production stages, or the like. Some learning types may be performed on the labelled images only, other may be performed on the unlabelled subset of images, yet other may be performed using both labelled and unlabelled images, or the like. As an example, supervised learning with class conditional probabilities may be performed on the subset of labelled images. As another example, unsupervised learning for in-distribution classification models may be performed on the subset of unlabelled images. As yet another example, lifelong learning with network plasticity may be performed using the whole training dataset comprising both labelled and unlabelled images.

The composition of the set of classification models may be determined randomly, arbitrarily, based on domain experts' decisions, based on previous iterations accuracy measurements, based on the composition of the training data, or the like. As an example, the set of classification models may comprise 3 lifelong classification models, each of which utilizes neural networks with different parameters; 2 classification models with noisy labels, each of which assumes different number of noisy labels, an in-distribution classification model, or the like.

It may be noted that in some exemplary embodiments, the set of classification models may comprise the predictor utilized in the classification task. Additionally or alternatively, the predictor may not be a member of the set of classification models. The predictor may or may not be applied on calibration dataset separately.

On Step 120, the set of classification models may be applied on a calibration dataset of images.

In some exemplary embodiments, the calibration dataset may comprise multiple images from different training stages, different production rounds, or the like. The calibration dataset may be a subset of the training dataset utilized for training of the classification models, a validation set determined based on the training dataset, a subset of recently obtained images, or the like. In some exemplary embodiments, the calibration dataset may be a same dataset utilized to train the predictor utilized for the in-site classification task. Additionally or alternatively, the calibration dataset may be different from the training dataset. It is also noted that in some cases, the calibration dataset may be unlabelled, and labels of the images therein may not be utilized. Instead, only the predicted labels may be utilized.

In some exemplary embodiments, each classification model may provide a label for each image in the production dataset. Each image of the calibration dataset of images may be provided with an array of predicted labels. As a result, a set of arrays of predicted labels for the calibration dataset may be provided.

As an example, the set of classification models may comprise n classification models denoted as $cls_1, \ldots, cls_n$. Each image of the calibration dataset may be provided with an array of predicted labels having a value of $(l_1, \ldots, l_n)$, where $l_i$ is a label from the same set of labels (L), that is predicted by $cls_1$, wherein the value of $(l_1, \ldots, l_n)$ is a potentially heterogeneous value.

On Step 130, a disagreement measurement of the set of classification models on the calibration dataset may be calculated. The disagreement measurement may be calculated based on the set of arrays of predicted labels for the calibration dataset. The disagreement measurement may be calculated based on a percentage of disagreement between the classification models of the set of classification models. Thus, the disagreement measurement may be affected by differences between predictions of classification models of the set of classification models on images in the calibration dataset.

In some exemplary embodiments, the disagreement measurement may be computed based on a portion of images for which a tuple of classification models of the set of classification models provide different labels. The disagreement measurement may be determined as a difference between predictions of a pair of classification models of the set of classification models on images in the calibration dataset, a difference between predictions of a triplet of classification models of the set of classification models on images in the calibration dataset, or the difference between any other tuple of classification models of the set of classification models on images in the calibration dataset.

Additionally or alternatively, the disagreement measurement may be computed based on a portion of images for which a tuple of classification models of the set of classification models provide a same label. The disagreement measurement may be indicative of a disagreement between predictions of the tuple of classification models over a certain label, a predetermined number of labels, or the like.

Additionally or alternatively, the disagreement measurement may be indicative of anomaly in the predictions of at least one classification model comparing with the predictions of other classification models in the set of classification models.

On Step 140, the set of classification models may be applied on a production dataset of images. In some exemplary embodiments, each classification model may provide a label for each image in the production dataset. As a result, a set of arrays of predicted labels may be generated for the production dataset.

It may be noted that in case the set of classification models does not comprise the predictor utilized for the classification task, the predictor may be applied separately on the production dataset, such as to perform a desired functionality of the system in accordance with the disclosed subject matter (e.g., implement an AOI process).

On Step 150, a production disagreement measurement of the set of classification models on the production dataset may be calculated. In some exemplary embodiments, the production disagreement measurement of the set of classification models on the production dataset may be calculated similarly to the calculation of the disagreement measurement of the set of classification models on the calibration dataset.

On Step 160, a similarity measurement between the production disagreement measurement and the disagreement measurement may be determined. In some exemplary embodiments, the similarity measurement may be indicative of how similar are the production disagreement measurement and the disagreement measurement. Without loss of generality, and for the purpose of clarity of the description, a low number may indicate low similarity, while a high number may indicate a high similarity. As an example, the measurement may be a number between 0 and 1, where 1 means the two disagreement measurements are identical, and 0 means they are as dissimilar as possible from one another. It will be noted that the disclosed subject matter may be implemented using a distance metric indicating a distance measurement between disagreement measurements. In such an embodiment, a low value may indicate similarity while a high value may indicate a difference.

On Step 170, in response to the similarity measurement being below the predetermined threshold (e.g., minimal similarity threshold is not met), a data drift in the production dataset may be indicated.

It is noted that a reduction in the disagreement measurement, e.g., when the set of classification models agree more than one another, may be as indicative of a data drift as an increase in the disagreement measurement. It may be noted if the classification models exhibit different disagreement patterns, such differences—irrespective of whether they agree more or less with one another—may be indicative that the production dataset is markedly different than the calibration dataset. Hence, the accuracy measurement of the predictor as determined with respect to the calibration dataset may no longer apply for the production dataset.

In some exemplary embodiments, a determination whether the similarity measurement is below a predetermined threshold may be performed. The predetermined threshold may be a value of the similarity measurement indicating the minimal similarity between the measurements that may indicate a data drift, such as about 20%, 30%, or the like.

In some exemplary embodiments, a similarity measurement below the predetermined threshold may indicate that the set of classification models provide a different disagreement pattern. In some cases, in view of a data drift, the classification models may disagree more than before, while in others the classification models may agree more. Additionally or alternatively, the properties of the instances in which different classification models agree or disagree may change in view of the data drift. As a result, in view of the disagreement measurement changing in production compared to in the calibration, a data drift may be autonomously identified.

On Step 180, in response to determining a drift in the production dataset, the predictor utilized for the classification task may be retrained. In some exemplary embodiments, the data drift may be indicative that training using existing training dataset is not suitable to the production dataset. A new training dataset for retraining the predictor may be determined in accordance with the production dataset. The new training dataset may be determined based on the production dataset, based on the calibration dataset, based on a combination thereof, or the like. Additionally or alternatively, the new training dataset may be determined separately, based on the similarity measurement, production disagreement measurement, outliers detection, or the like. As an example, the training dataset may be determined using the method of FIG. 3.

In some exemplary embodiments, once the predictor is re-trained and reaches a sufficient accuracy score, the training set used to train the predictor, the validation set used to validate the predictor, samples thereof, a combination thereof, or the like, may be utilized as new calibration dataset, while re-performing Steps 120-160.

Referring now to FIGS. 2A-2D showing schematic illustrations of exemplary disagreement measurements, in accordance with some exemplary embodiments of the disclosed subject matter.

In some exemplary embodiments, a Set of Arrays 220 of predicted labels for the calibration dataset may be generated by applying a set of classification models $cls_1, \ldots, cls_m$ on a calibration dataset comprising $sample_1, \ldots, sample_n$. Each image of the calibration dataset may be provided with an array of predicted labels having a value of $(l_1, \ldots, l_k)$, where $l_i$ is a label from the same set of labels, that is predicted by $cls_i$, wherein the value of $(l_1, \ldots, l_k)$ is a potentially heterogeneous value. As an example, Array 223 may be the array of predicted labels for the third image by the set of classification models $cls_1, \ldots, cls_m$ thereon.

In some exemplary embodiments, a disagreement measurement of the set of classification models $cls_1, \ldots, cls_m$ on the calibration dataset $\{sample_1, \ldots, sample_n\}$, may be calculated. The disagreement measurement may be calculated based on Set of Arrays 220. Thus, the disagreement measurement may be affected by differences between predictions of classification models of the set of classification models on images in the calibration dataset. The disagreement measurement may be calculated based on statistical measurements over values of Set of Arrays 220, aggregation thereof, disagreement between each two or more classification models, or the like.

In some exemplary embodiments, the disagreement measurement may be computed based on a portion of images for which a tuple of classification models of the set of classification models provide different labels. As an example, the disagreement measurement may be computed based on the difference over the labels provided by a subset of the classification models, such as $cls_1$, $cls_4$ and $cls_6$ on a portion of the images, such as $sample_{15}$, $sample_{18}$, $sample_{22}$ and $sample_{36}$.

Additionally or alternatively, the disagreement measurement may be determined as a difference between predictions of a pair of classification models of the set of classification models on images in the calibration dataset, a difference between predictions of a triplet of classification models of the set of classification models on images in the calibration dataset, or the difference between any other tuple of classification models of the set of classification models on images in the calibration dataset. As an example, Graph 240 may represent the predictions of $cls_1$ and $cls_2$ on the calibration set. Each point $(p_1, p_2)$ in Graph 240 may schematically represent a tuple of labels provided for an image by $cls_1$ and $cls_2$, where $p_1$ is a value representing the label provided for the image by $cls_1$ and $p_2$ is a value representing the label provided for the image by $cls_2$. As an example, Point 241 located in $(l_2, l_3)$, indicates that $cls_1$ provided the label $l_2$ to an image, while $cls_2$ provided the label $l_3$ to the same image (See also FIG. 2C).

It is noted that Graph 240 is schematically only, and shows different instances using different points, as if the labelling is a continuous value and not one of a set of enumerated potential values. It is noted that in some embodiments, the label may be a continuous value, such as a number between 0 and 1. Furthermore, such illustration serves the purpose of clarity of explanation in showing different instances that are similarly labelled by the two classifiers.

Points on Line 242 may represent images on which $cls_1$ and $cls_2$ agree on the classification thereof. Each cluster of points, such as Cluster 244, 246 and 248, may represent an agreement or disagreement pattern between the $cls_1$ and $cls_2$. As an example, Cluster 246 and Cluster 248, which are substantially on Line 242, may represent an agreement between the pair of classification models $cls_1$ and $cls_2$, with respect to $l_2$ (246) and to $l_4$ (248) while Cluster 244 may represent disagreement therebetween (e.g., with respect to instances that are classified as $l_2$ by $cls_1$ and as $l_4$ by $cls_2$). Statistical measurement may be performed on the different clusters to determine the disagreement measurement. Additionally or alternatively, the disagreement measurement may be indicative of anomaly in the predictions of at least one classification model comparing with the predictions of other classification models in the set of classification models. Cluster 244 may represent such anomaly between $cls_1$ and $cls_2$.

Figure 2A:
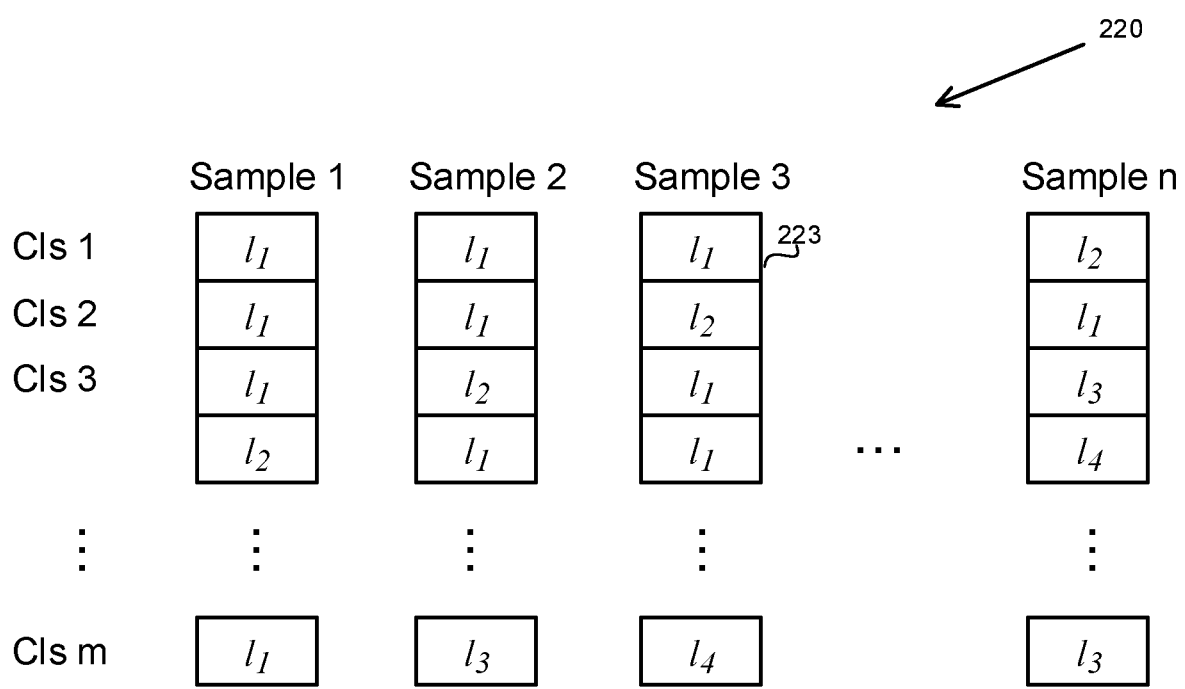
FIGS. 2A-2D show schematic illustrations of exemplary disagreement measurements, in accordance with some exemplary embodiments of the disclosed subject matter.
Figure 2B:
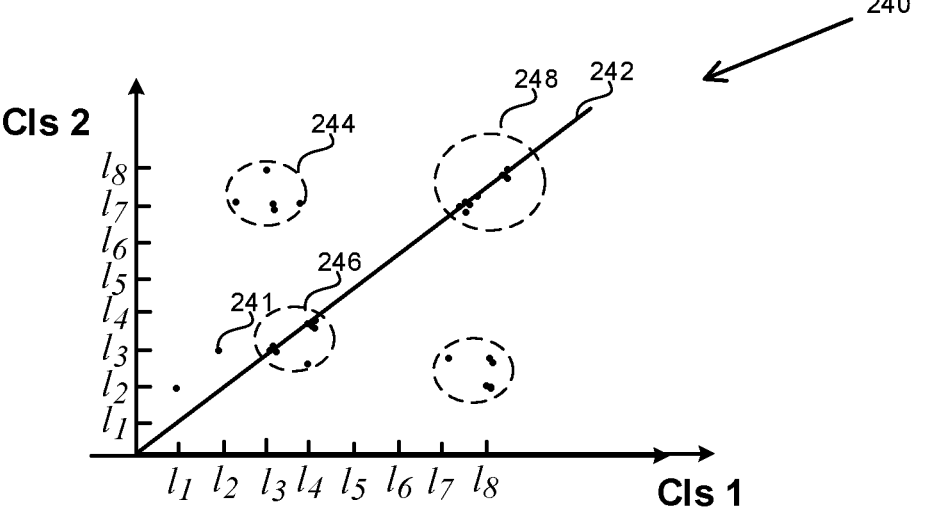
Figure 2C:
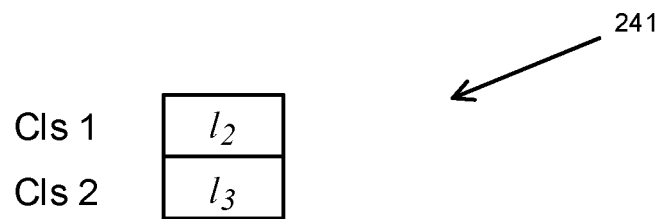
Figure 2D:
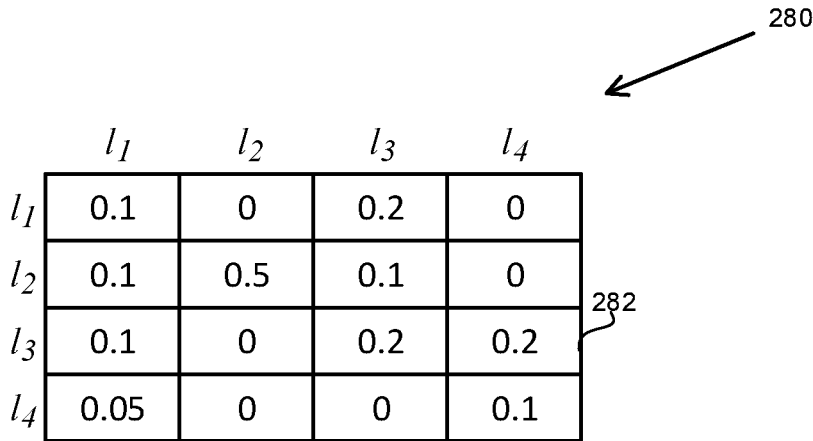

Additionally or alternatively, the disagreement measurement may be computed based on a portion of images for which a tuple of classification models of the set of classification models provide a same label. The disagreement measurement may be indicative of a disagreement between predictions of the tuple of classification models over a certain label, a predetermined number of labels, or the like. As an example, the disagreement measurement may be calculated based on Metric 280, as is illustrated in FIG. 2D. Each cell in Metric 280 comprises an agreement value representing the number or percentage of times a pair of classifiers provided a pair of labels. As an example, the value in Cell 282 indicates that the first classification model provided the label $l_4$ while the second classification model provided the label $l_3$ at 0.2 of the images. The disagreement measurement may be calculated based on cells indicating different labels, such as cells not on the diagonal of Metric 280. It may be noted that Metric 280 can be leveraged to multiple dimensions representing agreement values of multiple classifiers for each a pair of labels. Additionally or alternatively, a plurality of different matrices may be utilized such as comparing different tuples of classifiers.

Figure 3:
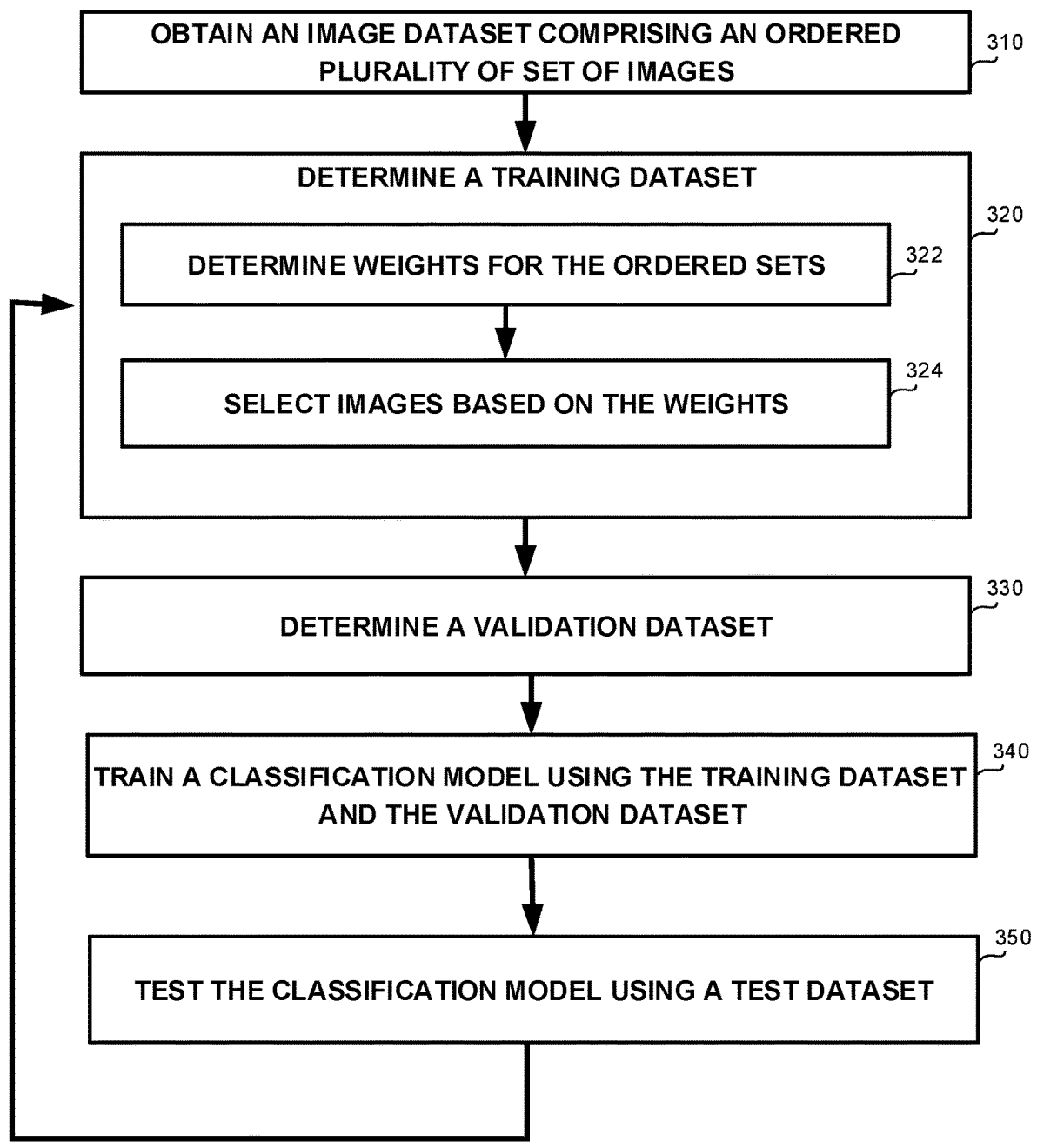
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 310, an image dataset comprising an ordered plurality of set of images may be obtained. Each set of images of the plurality of set may comprise images obtained over a time interval. The sets of images may be ordered according to their respective time intervals. As an example, the first set of images in the ordered plurality may comprise images obtained in a first time interval, such as on Monday. The second set of images in the ordered plurality may comprise images obtained in a second time interval, immediately succeeding the first time interval, such as Tuesday. It is noted that time intervals may be considered immediately succeeding if there are no additional sets having time intervals in between. For example, assuming images are captured only during the weekdays, the Monday time interval may be considered as immediately succeeding the Friday time interval. In some exemplary embodiments, the succeeding relationship may be based on the ordered plurality of sets and may be determined based on the relative order between two sets, and whether there are additional sets in between the two sets.

In some exemplary embodiments, images in the dataset may be labelled with labels indicating classes thereof. Additionally or alternatively, some of the images in the dataset may be unlabelled.

In some exemplary embodiments, a last set of images according to the ordered plurality of sets of images may be a recent production dataset. The recent production dataset may be obtained during application of a classification model in production on unlabelled images, such as in AOI process of FPD manufacture, PCB manufacture, or the like. In some exemplary embodiments, a plurality of production datasets may be included in the ordered plurality of sets of images, each of which may be ordered in accordance with the time interval in which the production dataset was obtained. The plurality of production datasets may be ordered last in the ordered plurality of sets, where the most recent production dataset may be ordered last from between the plurality of production datasets, and where the earliest production dataset may be ordered first from between the plurality of production datasets.

On Step 320, a training dataset may be determined. The training dataset may comprise images from the image dataset obtained in Step 310. The training dataset may be configured to be utilized to train a classification model utilized for a classification task of images having similar notion as the images in the image dataset.

On Step 322, a weight may be determined for each set of the ordered plurality of sets of images. In some exemplary embodiments, the weights may be provided non-uniformly, e.g., different sets with different properties may be assigned with different weights. However, it may be noted that some of the sets may be provided with similar or same weights.

In some exemplary embodiments, the weights may define a number of images to obtain from a set. The weights may define a relative number of images (e.g., a percentage of the images), an absolute number (e.g., a precise number of images), or the like. As an example, each set of images may be associated with a percentage indicating the ratio of images from the set of images to be selected from the set of images. A lowest weight value, such as a zero, a negative value, or the like; may indicate avoiding selecting any image from the associated set of images that is assigned the lowest weight value, e.g., dropping the associated set of images. Additionally, or alternatively, a maximal weight value, such as 100%, may indicate retaining all images of the associated set of images, e.g., retaining the associated set as a whole.

In some exemplary embodiments, the weights may be determined so as to correlate with the order of the sets of images, as defined based on their time intervals. In such a case, lower weights (e.g. weight indicating lower percentages) may be determined for older training datasets, implementing a "past-means-less" pattern. Additionally or alternatively, the determined weights may be correlated with the opposite of the order of the time intervals of the sets of images. In such a case, higher weights (e.g. weight indicating higher percentages) may be determined for older training datasets, implementing a "past-means-more" pattern.

In some exemplary embodiments, the weights for the ordered plurality of sets of images may be determined according to a non-uniform monotonic function, such as a strictly increasing monotonic function, a strictly decreasing monotonic function, a linear function, a non-linear function, or the like.

Additionally or alternatively, the weights for the ordered plurality of sets of images may be determined based on expected accuracy of classification models trained based thereon. The accuracies may be determined by training a classifier based on each set of images and determining accuracy thereof. Additionally or alternatively, the weights for the ordered plurality of sets of images may be determined based differences in the expected accuracy of classification models trained based on training data comprising the set of images and training data excluding the set of images. A classifier may be trained for each set of images based on a training dataset comprising a series of set of images preceding the set of images and including the set of images. The weight of each set of images may be determined based on a difference in an accuracy measurement of the associated classifier compared to an accuracy measurement of a classifier trained using the same training set but without the associated set of images. In case of an improvement in the accuracy measurement when the set of images is in the training data, the weight of the associated set of images may be correlated to a measurement of the improvement. In case of a reduction the accuracy measurement when the set of images is in the training data, a lowest weight value may be assigned to the associated second set of images.

Additionally or alternatively, a classifier may be trained using sub-series of sets and tested on successive sets to determine the influence of training using such sets on future sets. Each sub-series may comprise a predetermined number of successive sets of images from the ordered plurality of sets of images, such as 5 successive sets, 10 successive sets, 15 successive sets, or the like. The classifier trained based on the sub-series may be applied on one or more sets of images from the ordered plurality of sets of images, that are ordered immediately after a last set in the sub-series according to the order of the image dataset. The classifier may be applied on different pluralities of sets of images of different numbers, such as the next set of images ordered immediately after the sub-series, the next 2 sets of images, the next 4 sets of images, or the like. An accuracy measurement of the classifier on each different plurality may be calculated. The selection pattern may be determined based on the different accuracy measurements of the classifier trained based on each sub-series. As an example, weights for sets of images in the sub-series may be determined based on the accuracy measurement of applying the associated classifier on the next set of images, based on an average of the different accuracy measurements of the different pluralities, or the like. As another example, a determination of the number of sets of images ordered after the sub-series, to be skipped in training, may be determined, based on the accuracy measurements. A lowest weight value may be assigned for the sets ordered after the sub-series that the accuracy measurement of applying the classifier thereon is above a threshold, such as above 80%, above 90%, or the like. As yet another example, a lowest weight value may be assigned for a plurality of sequences of sets of images of the number of sets as the plurality of sets of images achieving the highest accuracy measurement above the predetermined threshold.

On Step 324, a subset of images may be selected from the ordered plurality of sets of images. In some exemplary embodiments, selection of images from each set of images may be performed based on the weight provided for the set. In some exemplary embodiments, a sample of the images of each set may be selected. The size of the sample may be determined based on the weight. As an example, the selection may be performed in accordance with a percentage of images to be selected from the set of images, that may be determined based on the weight. A portion of the set of images may be selected according to a ratio defined by the percentage associated with the each set. In some exemplary embodiments, if the set is not dropped altogether, a minimal number of instances therefrom may be selected, such as at least 10 images, at least 30 images, at least 100 images, or the like.

In some exemplary embodiments, the selection of the sample from each set of images may be performed in a random manner, a pseudo-random manner, or the like. A random sample that is selected may be a strict subset of the set from which it was selected, having a reduced size in comparison thereof. The random selection may yield a statistically valid sample, that is absent of biases. Additionally, or alternatively, in some cases, the selection may be biased such as intentionally implementing a desired bias.

In some exemplary embodiments, the training dataset may comprise exceptional data from certain time intervals, that may not be selected in accordance with the training data selection pattern, but may, however, be relevant to the classification task. As an example, a dataset of time interval that may introduce one or more new classes, eliminate one or more classes, or the like. Such training sets may be important to the classification task, despite not being selected accordance to the selection pattern, as they may enable adapting the set of classes that the classifier classifies thereto, and thus enhance the accuracy of the classification. As another example, datasets of a predetermined number of successive time intervals above a predetermined threshold, such as about 10 time intervals, 15 time intervals, or the like, that comprise samples classified to less prevalent classes, may be removed from the training dataset. In some cases, the number of samples classified to a certain category may be reduced for successive time intervals (e.g., less and less samples are being labelled to this category in the last time intervals). This may be indicative that such categories may become extinct in the near future and may be expected to be forgotten from the overall datasets. Additionally or alternatively, duplicate or similar samples may be removed from the training dataset. In order to determine such similarity, Deep Clustering, Entropy Maximization, Normalized Cross Correlation, and other algorithms, may be applied on dataset from different intervals.

On Step 330, a validation dataset and a test dataset may be determined. In some exemplary embodiments, the validation dataset may comprise images from the image dataset. The validation dataset may be configured to be utilized to validate the classification model during training, trained on Step 330. In some exemplary embodiments, the validation dataset may be determined in a similar manner to the determination of the training dataset (Step 320).

In some exemplary embodiments, the validation images may be selected from the ordered plurality of sets of images used to select the training dataset on Step 320. Additionally, or alternatively, the validation dataset may be selected from another dataset, such as previously utilized validation dataset, or the like.

In some exemplary embodiments, the validation dataset may be selected by selecting random samples from each set of the ordered plurality of sets of images. In some exemplary embodiments, the size of a random sample selected from a set may be determined based on a validation weight, in a similar manner to the selection made on Step 320. In some exemplary embodiments, the validation weight may be uniform for all sets, such as 10%, 20%, or the like. Additionally, or alternatively, a potentially different validation weight may be determined for each set of the ordered plurality of sets of images. In some exemplary embodiments, the validation weights may be determined oppositely from the weights utilized to select the training dataset. In case the weights for the ordered plurality of sets of images on Step 322 is performed based on a function $f(x)$, the validation weights may be determined based on a function $g(x)=-f(x)$. For example, in case of weights that increase monotonically in the training dataset, implementing a "past-means-less" pattern, the use of $g(x)$ may yield weights that accordingly decrease monotonically in the validation dataset, implementing a "past-means-more" pattern.

On Step 340, a classification model may be trained using the training dataset that was determined on Step 320 and the validation dataset determined on Step 330.

On Step 350, a test dataset may be utilized to test and validate the classification model trained using the training dataset. In some exemplary embodiments, using the test dataset, an accuracy measurement of the classification model trained on Step 340 may be determined.

Figure 4A:
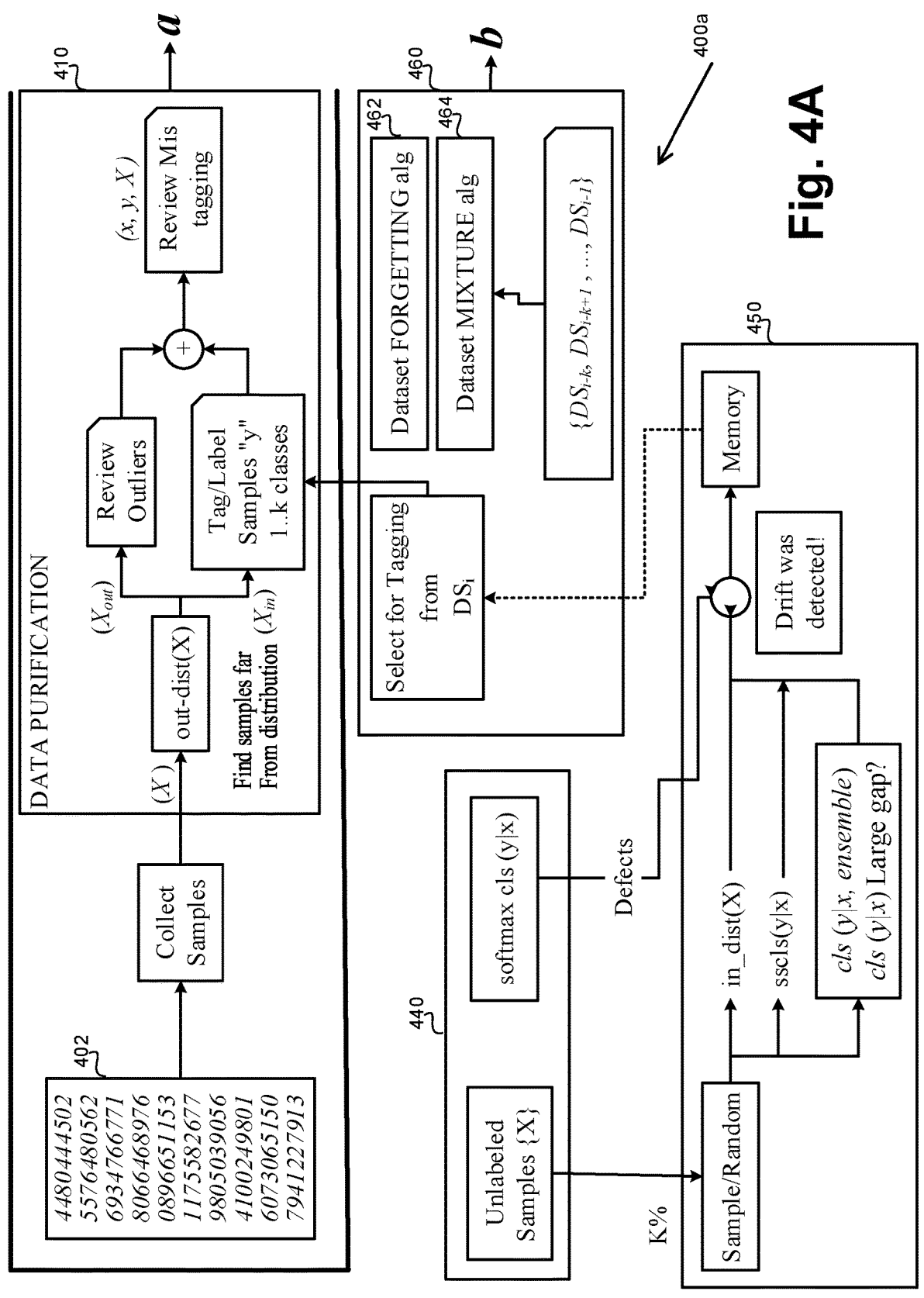
FIGS. 4A and 4B show a schematic illustration of an exemplary architecture, in accordance with some exemplary embodiments of the disclosed subject matter.
Figure 4B:
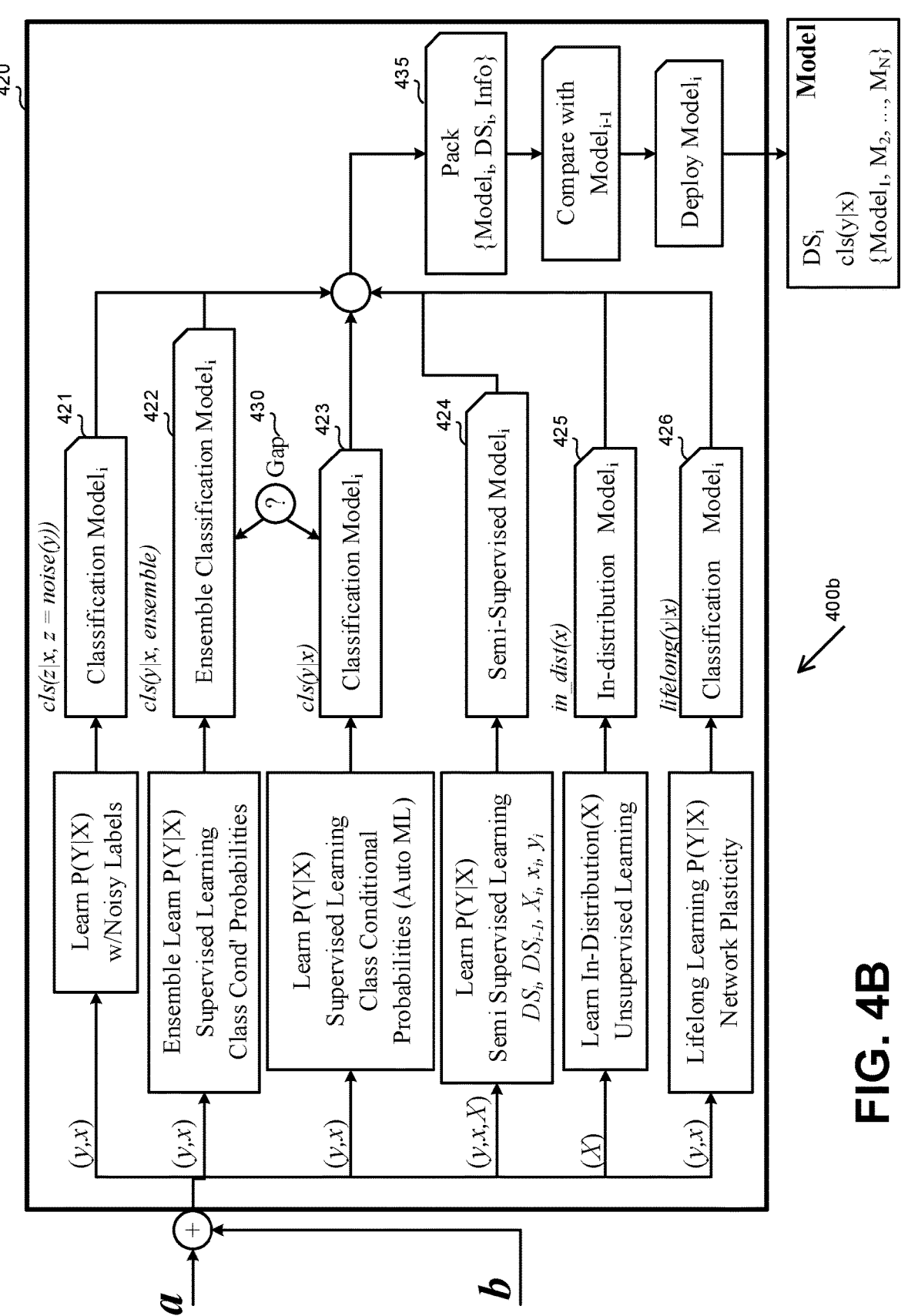

Referring now to FIGS. 4A and 4B showing a schematic illustration of an exemplary environment and architecture in which the disclosed subject matter may be utilized, in accordance with some exemplary embodiments of the disclosed subject matter.

In some exemplary embodiments, a system comprising sub-System 400a illustrated in FIG. 4A and sub-System 400b illustrated in FIG. 4B, may be configured to perform an adaptive learning for image classification in accordance with the disclosed subject matter.

In some exemplary embodiments, a classification model may be initially trained in a development site, based on an initial training data provided by the customer. The classification model may be utilized in a classification task at the customer site, for defect detection based on visual input, such as images of the product at different production stages, or the like. The classification model may be configured to predict for each obtained image, a label indicating a class thereof, from a predetermined set of classes. Each class may be associated or indicative of a defect in the product. The system may be configured to continuously monitor and enhance accuracy of the classification model, re-train the classification model based on updated training data, or the like.

In some exemplary embodiments, the classification model may be trained based on an initial training Dataset 402. Dataset 402 may comprise sampled images, each of which is labelled with a label indicating a class thereof. Additionally or alternatively, Dataset 402 may comprise unlabelled images. Dataset 402 may comprise images of production defects, images from previous production rounds, images of different product components, or the like.

In some exemplary embodiments, a Data Purification Module 410 may be configured to purify collected samples and evaluate labels thereof. Data Purification Module 410 may be configured to select samples from Dataset 402 and apply an "out-of-distribution" classifier on the selected samples. The out-of-distribution classifier may be configured to apply an unsupervised learning on the selected samples, to determine a distance of the image from the distribution of the data. Images having a similar distribution as the distribution of the data may be classified as in-distribution data, $X_{in}$, while images having distinct distribution may be classified as out-of-distribution data $X_{out}$.

In-distribution data $X_{in}$ may be classified and labelled using the classification model, may be labelled by human experts, or the like. The labelled data may be reviewed to determine whether is tagged with correct labels or not. Out-of-distribution data $X_{out}$ may be reviewed by human experts to determine whether such outliers can be labelled, provided as unlabelled data, removed, or the like. In some exemplary embodiments, corrupted images may be indicated as outliers, mistakenly taken images (e.g., taken in a wrong timing when the product being inspected is not visible therein), or the like.

In some exemplary embodiments, the selected data, which may comprise both labelled data (x,y) and unlabelled data (X), may be provided to Learning Module 420. In Learning Module 420, a set of classification models may be trained based on the selected data. Each classification model may be configured to predict a label for an image indicating a class thereof over the set of labels of Dataset 402.

In some exemplary embodiments, the set of classification models may comprise a plurality of classification models, such as Models 421-426. Each classification model may be trained using a different training scheme, with different parameters, with different conditions, or the like. As an example, Model 423 may be trained by supervised learning with class conditional probabilities. Each classification models may be trained using the labelled data (x,y), using the unlabelled data (X), a combination thereof, or the like. As an example, Model 425 which performs in-distribution classification may be trained using the unlabelled data (X). The composition of the set of classification models may be determined randomly, arbitrary, based on previous iterations accuracy measurements, based on the composition of the training data, or the like. The composition of the classification models may differ from one iteration to another.

In some exemplary embodiments, a disagreement measurement of the set of classification models may be calculated. The disagreement measurement may be calculated based on a gap (e.g., a difference) between the predictions of each pair or tuple of classification model. As an example, a Gap 430 may be calculated between the prediction results of Model 422 and Model 423. In some exemplary embodiments, calculated gaps may be useful for understanding how robust the set of classification models. The larger the gap, the greater is the disagreement measurement, the more informative may be the classification models as judges. The disagreement measurement may later be compared with disagreement measurement on real time prediction data, to determine how much images in the production data are different from the data used in training. Additionally or alternatively, the disagreement measurement may later be compared with disagreement measurement on real time prediction data, to determine a predicted resiliency of the classification model to these images.

Additionally or alternatively, the disagreement measurement may be determined based on other distances between the prediction results, based prediction results of one or more classification models, or the like. As an example, the prediction results Model 425 may be indicative of the distribution of the data, and may be compared with previous predictions of similar classification models, with predetermined threshold, or the like.

Additionally or alternatively, the set of classification models, e.g., Models 421, 422, 423, 424, 425, 426, may be aggregated together into a packaged Model 435. Model 435 may be saved along with the training dataset utilized for training of the set of classification models, and other information related thereto, such as the similarity measurement thereof, distribution measurements of the data, or the like. In some exemplary embodiments, Model 435 may be compared with the model generated in the previous iteration by Learning Module 420. In case of an improvement in the accuracy thereof, Model 435 may be deployed. Otherwise, the previous model may be deployed.

In some exemplary embodiments, the set of classification models may comprise a main classification model to be utilized the classification task by Classification Module 440. The main classification model, also referred to as the predictor, may be an ensemble classifier, such as Model 422, or any other classifier that predicts labels to unlabelled images, such as Model 423, Model 424, or the like. It may be appreciated that it may be preferred that the main classification model be executed fast, consume a relatively low amounts of resources, or the like. In some exemplary embodiments, the main classification model may be configured to determine probability of each class label to be selected over the dataset, such as using a Softmax layer. in response to obtaining a new production set of images $X_{new}$, Classification Module 440 may apply the main classification model on the new production dataset. Defects, such as images labelled as showing an existence of a defect in the product, may be provided to Model Tracking Module 450. In some exemplary embodiments, all or substantially all images of defects may be provided to Model Tracking Module 450 as the vast majority of the images may be labelled as not including any defect, such as it is expected to be in a functioning production plant, where most products meet the desired quality level.

In some exemplary embodiments, a predetermined percentages K % of images from the new production set of images $X_{new}$ may be provided to Model Tracking Module 450. The predetermined percentages K % may be 5%, 10%, or the like. Such images may be utilized as a production dataset that is compared against a calibration dataset, to determine whether the new production set of images $X_{new}$ comprises a data drift, e.g., coming from a different image-generation-process distribution. A data drift may reduce the assurance level one may have in the accuracy of the main classification model, which was trained and validated using calibration dataset from which the production dataset drifted away.

In some exemplary embodiments, Model Tracking Module 450 may be configured to determine anomalies in the new production set of images $X_{new}$, mismatch between new production set of images $X_{new}$ and the main classification model, alerting on model accuracy degradation, tagging special outlier images, or the like. Model Tracking Module 450 may be configured to apply each of Models 421-426, on the production dataset, as "judge" classifiers. A production disagreement measurement of the classification models on the production dataset may be calculated and compared to the disagreement measurement of the classification models calculated by Learning Module 420 using a calibration dataset. The production disagreement measurement may be calculated in a similar manner as the disagreement measurement, such as based on a gap between the predictions of each pair or tuple of classification model, based on comparison between in-distribution classifiers results, or the like.

In some exemplary embodiments, in case a data drift is determined, the production dataset along with the subsets of defects may be provided to Training Dataset Selection Module 460. Training Dataset Selection Module 460 may be configured to determine which data should be selected for re-training the main classification model.

In some exemplary embodiments, images determined as special, such as images suspected to involve defects, outliers, drifting images, images not fitting to known classes, or the like, may be selected for re-training. Such images may be provided for Data Purification Module 410 to be re-labelled by a human expert.

Additionally or alternatively, Training Dataset Selection Module 460 may be configured to select images from available data over time. The available data may be saved in several sets of images, each of which comprises images obtained over a time interval. As an example, dataset $DS_{i-k}$ may comprise images obtained at the time interval between point-in-time i and k time points back from i (e.g. 8 days back from today). The sets of images may be ordered according to their respective time intervals, such as $\{DS_{i-k}, DS_{i-k+1}, \ldots, DS_{i-1}\}$.

In some exemplary embodiments, Training Dataset Selection Module 460 may be configured to apply a Dataset Forgetting Algorithm 462 on the sets of images. Dataset Forgetting Algorithm 462 may be configured to determine, which sets should be selected for retraining, and which sets should be forgotten—e.g., excluded from the re-training dataset. Dataset Forgetting Algorithm 462 may be configured to apply a different hypothesis to select which datasets to forget, such as forgetting old sets of images, forgetting out-of-distribution set of images, forgetting sets of images considered to reduce the overall accuracy of the classification model, forgetting sets of images that are noisy compared to other sets, or the like. Additionally or alternatively, Dataset Forgetting Algorithm 462 may be configured to apply best practices hypothesis, based on the industry type, imaging techniques, statistical measurements, or the like.

Additionally or alternatively, Training Dataset Selection Module 460 may be configured to apply a Dataset Mixture Algorithm 464 on the sets of images selected by Dataset Forgetting Algorithm 462. Dataset Mixture Algorithm 464 may be configured to determine which portions of the selected sets should be selected for re-training. Dataset Mixture Algorithm 464 may be configured to apply different selection hypothesis, such as "past-means-more" hypothesis, where more images from older datasets are selected; "past-means-less" hypothesis, where more images from newer datasets are selected; selection based on potential accuracy of training, or the like.

In some exemplary embodiments, the selected images may be provided for Learning Module 420 for re-training of set of classification models. Such selected images may be the new calibration dataset utilized to determine a new disagreement measurement.

Figure 5:
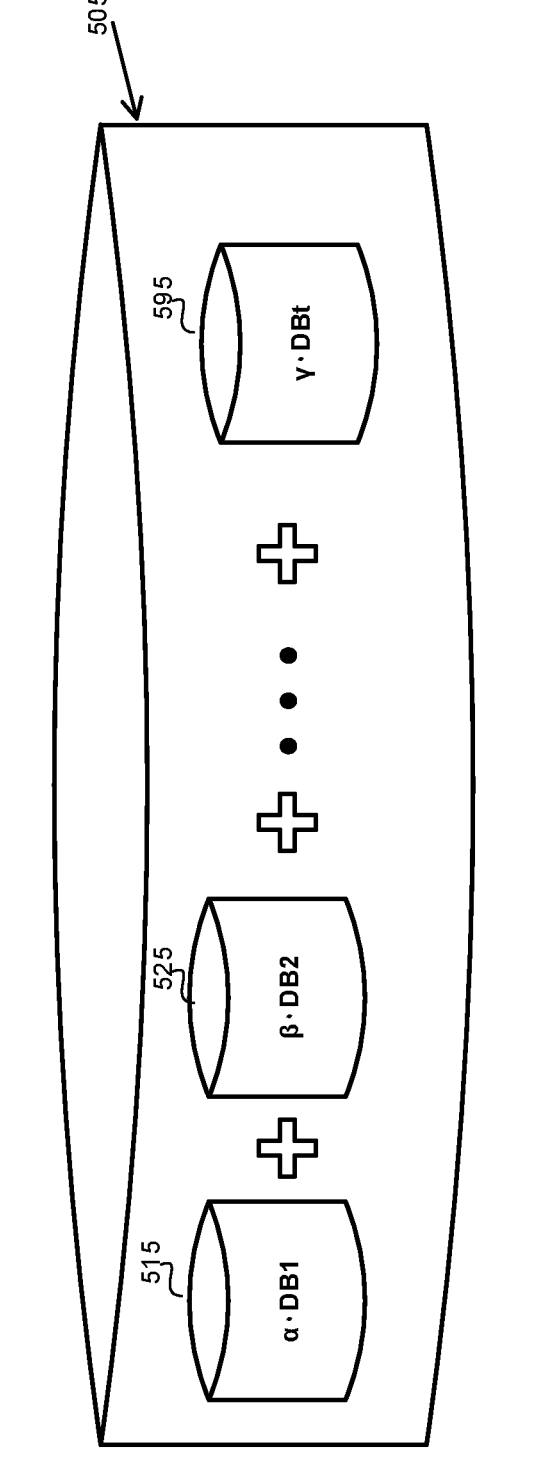
FIG. 5 shows a schematic illustration of an exemplary data selection over datasets, in accordance with some exemplary embodiments of the disclosed subject matter.

Referring now to FIG. 5 showing a schematic illustration of an exemplary data selection over datasets, in accordance with some exemplary embodiments of the disclosed subject matter.

In some exemplary embodiments, an Image Dataset 500 may comprise an ordered plurality of sets of images: Databases 510, 520 . . . , 590. Each set of images may comprise images obtained over a time interval. Each time interval may be of a predetermined period relevant to the pace of production, such as a time period indicative of a production round, a time period indicative of a classification round, or the like. Additionally or alternatively, the time period may be determined based on the pace of changes in the sampled images, such as the average time period over past samples in which images with different statistical features were obtained, or the like. As an example, in the PCB industry, it may be common to have a fast change between manufactured devices, such as replacing the scanned design every 2 or 3 days, or the like. Accordingly, each time interval may consist several hours, such as 8 hours, 12 hours, 24 hours, or the like; several days, such as 2 days, 5 days, a work week, or the like.

In some exemplary embodiments, the plurality of sets of images may be ordered according to the order of the time intervals in which images in each set are obtained. As an example, Database 510 may comprise images obtained in the oldest time interval, Database 520 may comprise images obtained in the immediate next time interval after the oldest time interval, or the like. Database 590 may comprise images obtained in the latest (e.g., newest) time interval. Database 590 may be a production dataset, e.g. a set of images obtained in the last time interval during application of the classification model in production on unlabelled images. Such images may be unlabelled, may be partially labelled, may be labelled by an un-updated classification model, or the like.

In some exemplary embodiments, a Training Dataset 505 may be determined based on Image Dataset 500. Training Dataset 505 may be utilized to train a classification model that is configured to predict, for each given image, a label indicating a class thereof. In some exemplary embodiments, the classification model may be utilized in a continual AI-classification task with potential changes in the data to be classified in each round, such as in defect detection in FPD or PCB industries or the like. The classification model may periodically be re-trained in order to preserve its accuracy, but may also be required not to get disrupted by new data. Accordingly, the training data may be required to comprise both recent samples and old samples. The amount of samples from each time interval may be varied based on requirements of the classification task, the nature of the changes in the data, or the like.

In some exemplary embodiments, a weight may be determined for each set of images in Images Dataset 500. The weights may be non-uniform and may differ from one set to another. The weights may be determined according to different selection patterns, such as but not limited to patterns described in FIG. 6A. In some exemplary embodiments, the selection patterns may be determined based on the client's needs, such as providing more accurate results of classification on recent designs and less on old scanned designs, or the like. The weight may be indicative of the amount of images to be selected from each set of images (e.g., each time interval). As an example, each weight may be equal to a percentage indicating a portion of the associated set of images according to a ratio defined by the percentage. As another example, the weight may be a ratio of images from the set of images to be selected, a maximal number of images to be selected from the set of images, a minimal number of images to be selected from the set of images, or the like.

In some exemplary embodiments, a subset of each set of images from Image Dataset 500 may be selected to be comprised by Training Dataset 505. Each subset may be selected based on the weight determined for the associated set. As an example, a percentage (or a ratio) $\alpha$ may be selected from Database 510, a percentage $\beta$ from Database 520, or the like. Accordingly, Training Dataset 505 may comprise a plurality of subsets of images, such as Subset 515, Subset 525 . . . Subset 595. Size(S) may indicate a number of images in an image set S. In some exemplary embodiments, Size(Subset 515)=$\alpha$·Size(Database 510), Size (Subset 520)=$\beta$·Size(Database 525), . . . , Size(Subset 595)=$\gamma$·Size(Database 590).

It may be noted that at least a pair of weight (or percentages) α, β . . . γ are different e.g., α≠β). It may further be noted that some percentages may be 0, e.g., no images may be selected from the associated set of images.

Figure 6A:
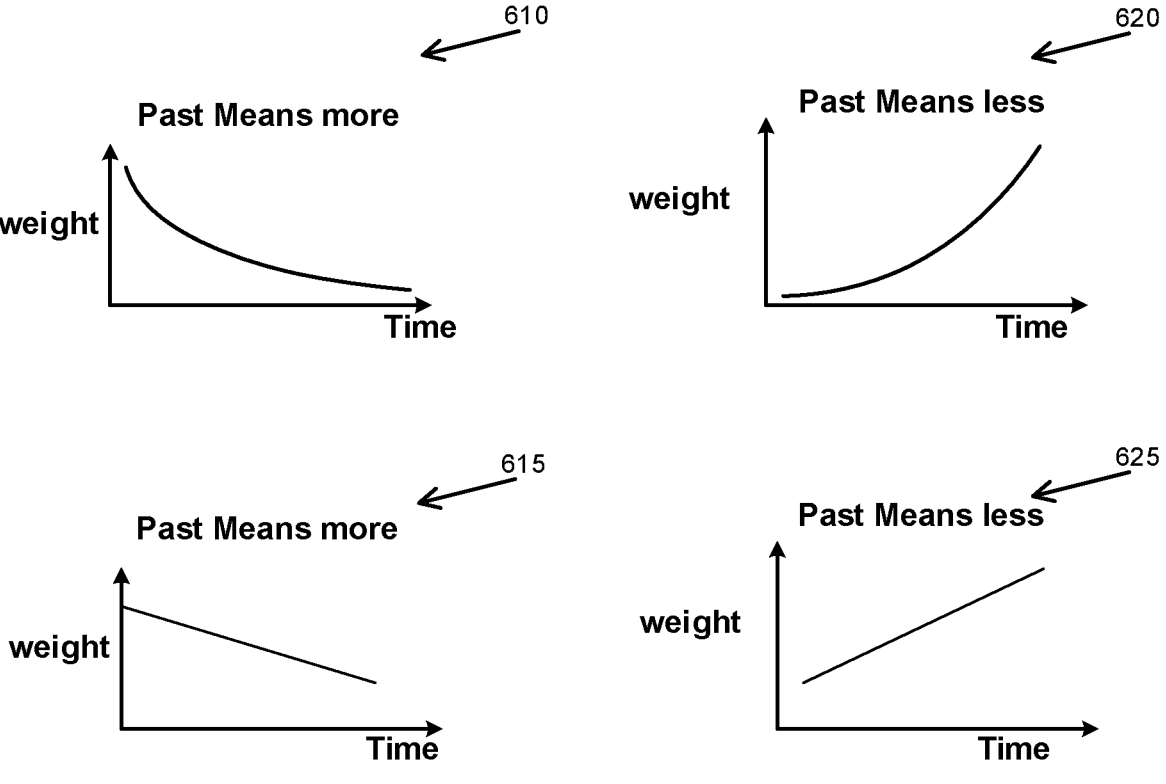
FIGS. 6A and 6B shows schematic illustrations of exemplary training data selection patterns, in accordance with some exemplary embodiments of the disclosed subject matter.
Figure 6A:
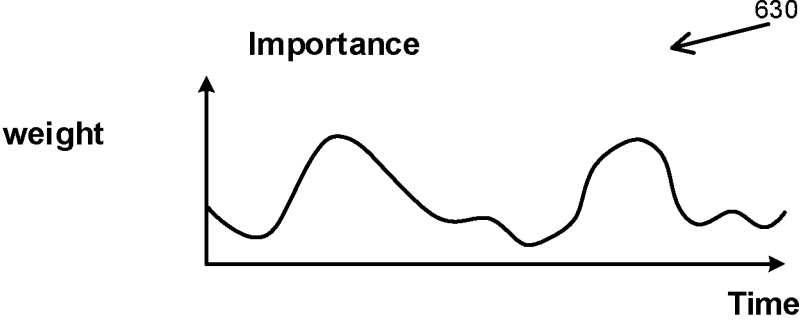

Referring now to FIG. 6A showing schematic illustrations of exemplary training data selection patterns, in accordance with some exemplary embodiments of the disclosed subject matter.

In some exemplary embodiments, weights determined for sets of images (such as the sets of images in Images Dataset 500 of FIG. 5), may be correlated with order of the time intervals associated therewith. In some exemplary embodiments, lower weights indicating lower percentages of images to be selected, may be determined for older training datasets, such as in Pattern 610, 615 ("past means more" patterns). In such selection patterns, more images are selected from recent datasets and less from old datasets. Accordingly, the classification model may be stronger (e.g. more accurate) on recent samples and less accurate on past samples. Additionally or alternatively, higher weights indicating higher percentages of images to be selected, may be determined for older training datasets, such as in Pattern 620, 625 ("past means less" patterns). In such selection patterns, more images are selected from old datasets and less from recent datasets. Such pattern may be relevant when data from older datasets is more informative to the recent samples than newer data, such as when new defects are introduced, repeated defects from older time-intervals, or the like. In some exemplary embodiments, the weight may be determined according to a monotonic function of the time. The monotonic function may be a non-uniform function, such as a strictly increasing monotonic function (as in Pattern 620, 625), a strictly decreasing monotonic function (as in Pattern 610, 615), a linear function (as in Pattern 615, 625), a non-linear function (as in Pattern 610, 620), or the like.

Additionally or alternatively, the weights of the sets of images may be determined based on an importance measurement of the set of images, such as accuracy of training based thereon, variance over the samples, introducing new classes, or the like (as in Pattern 630).

In some exemplary embodiments, the weight of each set of images may be determined based on potential accuracy of classification models trained based thereon on when applied future datasets. The potential accuracy may be determined by training a classifier based on a training dataset comprising the set of images, and applying the trained classifier on sets of images obtained later thereto. The resulted accuracy may be compared to an accuracy of other classifier trained without the associated set of images. As an example, a first classifier may be trained based on a first dataset that comprises successive sets of images. A second classifier may be trained based on a second dataset that comprises, in addition to sets of images comprised by the first dataset, an additional set of images that is ordered immediately after the last set of images of the first dataset. The weight of the additional set of images may be determined based on a difference in an accuracy measurement of the second classifier compared to an accuracy measurement of the first classifier. In case the difference in the accuracy measurement of the second classifier compared to the accuracy measurement of the first classifier indicates an improvement, the weight of the additional set of images may be correlated to a measurement of the improvement. In case the difference in the accuracy measurement of the second classifier compared to the accuracy measurement of the first classifier indicates a reduction in accuracy, the weight of the additional set of images may be assigned with a lowest weight value, indicating avoiding selecting any image Additionally or alternatively, a classifier may be trained based on each set of images along with all sets of images preceding thereto. The accuracy measurement of each classifier may be compared to the accuracy measurement of the classifier trained based on the previous set of images and sets preceding thereto. As an example, for each new set of images obtained at time interval t, a new classifier $Cls_t$ may be trained based on all sets of images until the new set of images (e.g., an accumulated training dataset, comprising the previous dataset (until time interval t−1), and the new set of images (the set obtained at time interval t)). The accuracy measurement of classifier $Cls_t$ may be compared to the accuracy measurement of classifier $Cls_{t-1}$ (e.g. the classifier trained based on all sets of images until the set of images obtained at time interval t−1). The weight determined for the new set of images obtained at time interval t may be correlated to the difference between the accuracy measurements.

Additionally or alternatively, weights may be provided to tuples of sets of images (e.g. series of sets of images) as one unit, such as tuples of 5 sets of images, 10 sets of images, or the like. Each set of images in the tuple may be assigned with the same weight. Each tuple of sets may be utilized to train a classifier to be applied on images from a future (e.g. successive) sets of images. The classifier may be applied on a sub-series of sets of images that are ordered immediately after a last set in the tuple in accordance with the order of the plurality of sets of images; to determine accuracy measurement thereof. A weight for each tuple may be determined based on the accuracy measurement of applying the classifier trained based thereon on the successive sub-series of sets of images. Tuples with accuracy measurement above a minimal accuracy threshold, may be assigned a lowest weight value, indicating avoiding selecting any image from the sets of images in the tuple (e.g., dropping such sets of images from the training dataset). Additionally or alternatively, the number of time intervals (e.g., the number of sets of images) that can be skipped in the process of re-training, may be determined. A high accuracy measurement (such as above the predetermined threshold) may be indicative of predictive power of the classification model and the non-necessity of additional training for such data. As an example, a lowest weight value may be assigned to sub-series of sets of images having the same number of sets as in the sub-series providing an accuracy measurement above a predetermined similarity threshold.

In some exemplary embodiments, one or more exceptions may be applied on the selection pattern. As an example, sets of images that introduce new categories of classification (e.g. new classes), may be selected to be in the training dataset as whole, may be provided with a highest weight, or the like; in order to introduce the new categories in the re-training. As another example, sets of images eliminating classification to one or more classification categories (e.g., with no images classified to one or more classes), may be discarded from the training dataset. Additionally or alternatively, images from all sets of images that are classified to the eliminated classes may be removed from the sets of images, and thus not selected to be in the training dataset. As yet another example, classes with unbalanced number of images classified thereto over time, with decreasing number of images classified thereto over time, or the like, may also be considered as eliminated and images classified thereto may be removed.

Additionally or alternatively, duplicated or similar images may be removed from the training dataset. Statistical techniques, such as Deep Clustering, entropy maximization, Normalized Cross Correlation between dataset images, may be applied on the selected images in order to determine similarity therebetween. Images having a similarity measurement above a predetermined threshold, such as above 90%, above 95%, or the like, may be removed from the training dataset.

Figure 6B:
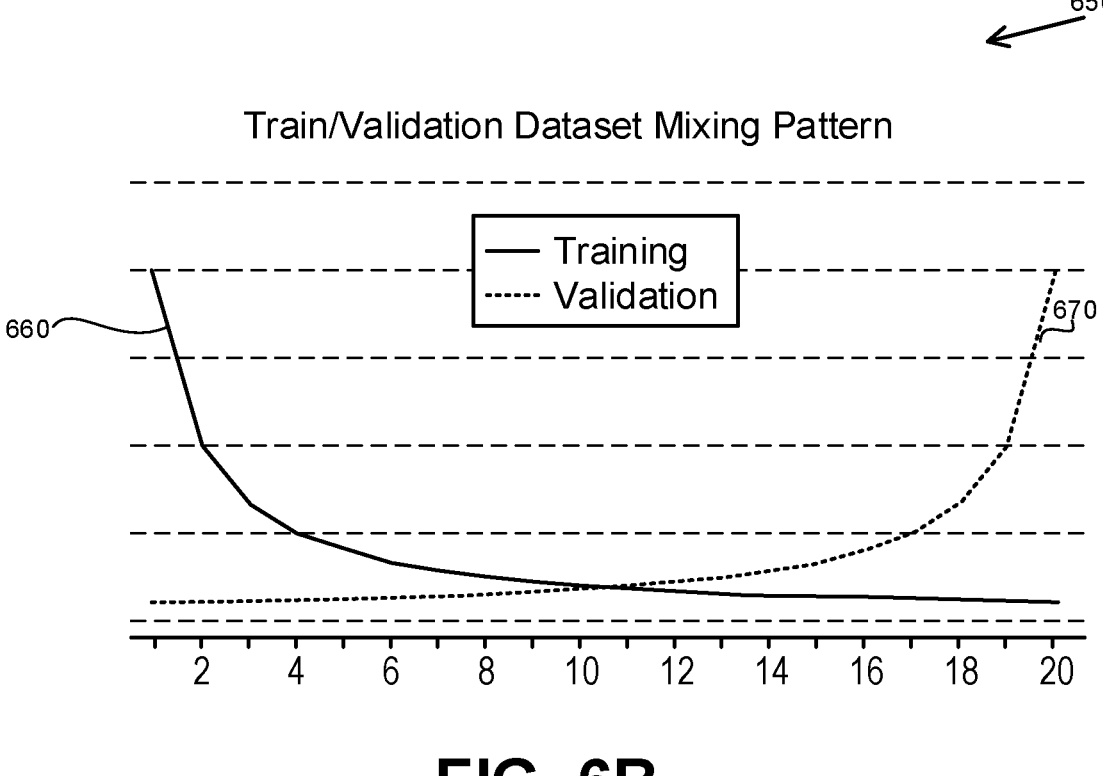

Referring now to FIG. 6B showing a schematic illustration of an exemplary training dataset and validation dataset selection patterns, in accordance with some exemplary embodiments of the disclosed subject matter.

In some exemplary embodiments, a validation dataset of images may be selected based on the ordered plurality of set of images. A validation weight may be determined for each set of images. The validation set of images may be selected from the ordered plurality of sets of images based on the validation weights thereof.

In some exemplary embodiments, the validation weights may be determined in a selection pattern opposite to the selection of the training set.

As an example, Graph 650 may depict a training dataset and a validation dataset selection patterns. The training selection pattern may be according to a function $f(t)$ depicted in Curve 660, which may represent the weights of sets of images over time, the percentages of images selected from each set of images over time, or the like. The validation dataset selection pattern may be according to a function $g(t)$ depicted in Curve 670, where $g(x)=-f(x)$. The training selection pattern depicted in Curve 660 is a non-linear "past-means-more" pattern. The validation dataset selection pattern depicted in Curve 670 is a non-linear "past-means-less" pattern.

Additionally or alternatively, a test dataset for testing the re-trained classification model may be selected based on the ordered plurality of set of images. As an example, the test dataset may comprise a predetermined percentage of images from each set of images, such as 10%, 15%, or the like, from the set of images.

The present invention may be a system, a method, or a computer program product. The computer program product may include a computer readable storage medium having instructions thereon for causing a processor to carry out aspects of the present invention.

The computer readable storage medium can be a tangible device that can retain and store instructions for use by an instruction execution device. The computer readable storage medium may be, for example, but is not limited to, electronic, magnetic optical storage, or the like, such as but not limited to a hard disk, a random access memory (RAM), a read-only memory (ROM), an erasable programmable read-only memory (EPROM or Flash memory), or the like. In some cases, the instructions may be downloadable to the storage medium from a server, a remote computer, a remote storage, or the like.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart and block diagrams of methods, apparatus, systems, and computer program products. It will be understood that each block in the diagrams, and combinations of blocks in the diagrams, can be implemented by computer readable program instructions.

The computer readable program instructions may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified in the block of the diagrams.

The flowchart and block diagrams in the figures illustrate possible implementations of various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and combinations of blocks can be implemented by special purpose hardware-based systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

27

What is claimed is:

1. A method comprising:

imaging a product to generate an image with a camera or optical sensor, wherein the product is a flat panel display or a printed circuit board;

identifying a defect in the image;

obtaining a set of classification models, each of which is a neural network trained to predict a label for the image, wherein the predicted label indicates a class of the defect in the image, wherein each classification model of the set of classification models is configured to predict a label from a same set of labels;

applying a predictor on a production dataset, wherein the predictor is a neural network trained to predict, for the image, a label from the same set of labels;

applying the set of classification models on a calibration dataset of images thereby providing for each image of the calibration dataset of images an array of predicted labels and providing a set of arrays of predicted labels for the calibration dataset, wherein the predicted labels for the calibration dataset of images are provided by one of the classification models;

calculating a disagreement measurement of the set of classification models on the calibration dataset, wherein the disagreement measurement is calculated based on the set of arrays of predicted labels for the calibration dataset, wherein the disagreement measurement is affected by differences between predictions of classification models of the set of classification models;

applying the set of classification models on the production dataset of images thereby providing a set of arrays of predicted labels for the production dataset;

calculating a production disagreement measurement of the set of classification models on the production dataset;

determining a similarity measurement between the production disagreement measurement and the disagreement measurement;

in response to the similarity measurement being below a predetermined threshold, indicating a data drift in the production dataset; and in response to said indicating the drift in the production dataset, retraining the predictor based on at least a portion of the production dataset.

2. The method of claim 1, wherein the set of classification models excludes the predictor.

3. The method of claim 1, wherein the set of classification models comprises the predictor.

4. The method of claim 1, further comprising re-computing the disagreement measurement based on the at least a portion of the production dataset.

5. The method of claim 1, wherein the disagreement measurement is computed based on a portion of images for which a tuple of classification models of the set of classification models provide different labels.

6. The method of claim 1, wherein the disagreement measurement is computed based on a portion of images for which a tuple of classification models of the set of classification models provide a same label.

7. The method of claim 1, wherein the set of classification models comprise n classification models denoted as $cls_1, \ldots, cls_n$, wherein the disagreement measurement is computed based on a portion of images for which the set of classification models provide an array of predicted labels having a value of $(l_1 \ldots, l_n)$, where $l_i$ is a label from the same set of labels that is predicted by $cls_i$ wherein the value of $(l_1 \ldots, l_n)$ is a heterogeneous value.

8. A computer program product comprising a non-transitory computer readable storage medium retaining program instructions, the computer program product configured to carry out the method of claim 1.

9. A computerized apparatus having a processor, the processor being adapted to perform the steps of:

sending instructions to image a product to generate an image with a camera or optical sensor, wherein the product is a flat panel display or a printed circuit board;

identifying a defect in the image;

obtaining a set of classification models, each of which is a neural network trained to predict a label for the image, wherein the predicted label indicates a class of the defect of the image, wherein each classification model of the set of classification models is configured to predict a label from a same set of labels;

applying the set of classification models on a calibration dataset of images thereby providing for each image of the calibration dataset of images an array of predicted labels and providing a set of arrays of predicted labels for the calibration dataset, wherein the predicted labels for the calibration dataset of images are provided by one of the classification models;

applying a predictor on a production dataset, wherein the predictor is a neural network trained to predict, for the image, a label from the same set of labels;

calculating a disagreement measurement of the set of classification models on the calibration dataset, wherein the disagreement measurement is calculated based on the set of arrays of predicted labels for the calibration dataset, wherein the disagreement measurement is affected by differences between predictions of classification models of the set of classification models;

applying the set of classification models on the production dataset of images thereby providing a set of arrays of predicted labels for the production dataset;

calculating a production disagreement measurement of the set of classification models on the production dataset;

determining a similarity measurement between the production disagreement measurement and the disagreement measurement;

in response to the similarity measurement being below a predetermined threshold, indicating a data drift in the production dataset; and in response to said indicating the drift in the production dataset, retraining the predictor based on at least a portion of the production dataset.

* * * * *